United States Patent [19]

Kawamura

[11] Patent Number: 5,432,383
[45] Date of Patent: Jul. 11, 1995

[54] ELECTRIC GENERATOR SYSTEM FOR GAS TURBINE

[75] Inventor: Hideo Kawamura, Samukawa, Japan

[73] Assignee: Isuzu Ceramics Research Institute Co., Ltd., Fujisawa, Japan

[21] Appl. No.: 110,769

[22] PCT Filed: Oct. 20, 1989

[86] PCT No.: PCT/JP89/01078

§ 371 Date: Jun. 20, 1990

§ 102(e) Date: Jun. 20, 1990

[87] PCT Pub. No.: WO90/04883

PCT Pub. Date: Mar. 5, 1990

Related U.S. Application Data

[63] Continuation of Ser. No. 3,694, Jan. 13, 1993, abandoned, which is a continuation of Ser. No. 887,371, May 21, 1992, abandoned, which is a continuation of Ser. No. 499,428, Jun. 20, 1990, abandoned.

[30] Foreign Application Priority Data

Oct. 20, 1988 [JP] Japan .................... 63-264829

[51] Int. Cl.$^6$ ............ H02P 9/04; B60L 11/02
[52] U.S. Cl. ................... 290/14; 180/65.1; 180/65.4; 290/17; 290/45
[58] Field of Search ............ 290/14, 17, 45; 180/65.1, 65.4

[56] References Cited

U.S. PATENT DOCUMENTS

| | | | |
|---|---|---|---|
| 3,499,164 | 3/1970 | Ferre et al. | 290/17 |
| 4,309,620 | 1/1982 | Bock | 290/17 |

FOREIGN PATENT DOCUMENTS

| | | | |
|---|---|---|---|
| 136620 | 7/1946 | Australia | 290/14 |
| 120302 | 9/1980 | Japan | 290/45 |
| 455555 | 2/1968 | Switzerland | |
| 14166 | of 1907 | United Kingdom | 290/14 |
| 1509397 | 5/1978 | United Kingdom | 290/14 |

*Primary Examiner*—Brian K. Young
*Assistant Examiner*—Robert Lloyd Hoover
*Attorney, Agent, or Firm*—Staas & Halsey

[57] ABSTRACT

An electric generator system for a gas turbine converts the mechanical output power of the shaft of a gas turbine into electric energy with a plurality of electric generators (4, 5) mounted coaxially on the turbine shaft. When the electric energy is supplied to a motor vehicle drive unit (7), the electric output power of only one of the generators is converted and supplied to the drive unit (7) if both load on the motor vehicle is small, or the electric output powers of the generators are converted and supplied to the drive unit (7) if the load is large. Therefore, the effective efficiency of the generators (4, 5) is maintained at a high level.

3 Claims, 1 Drawing Sheet

ELECTRIC GENERATOR SYSTEM FOR GAS TURBINE

This application is a continuation of application number 08/003,694, filed Jan. 13, 1993; which is a continuation of Ser. No. 07/887,371, filed May 21, 1972, now abandoned, which is a continuation of application Ser. No. 07/499,428, filed Jun. 20, 1990, now abandoned.

BACKGROUND OF THE INVENTION

The present invention relates to an electric generator system for being mounted on the output shaft of a gas turbine, and more particularly to an electric generator system for a gas turbine, which produces electric output power for driving wheels to propel a motor vehicle.

Gas turbines, which generate rotary mechanical output power based on combustion gases that are produced upon combustion of fuel and supplied at high temperature under high pressure, are mechanically simpler and easier to handle than steam turbines and reciprocating engines. Since gas turbines can produce large horsepower, can use low-quality fuel, and are less liable to break down and vibrate, they are used as prime movers for electric generators and ships.

In one application, a gas turbine is used as a prime mover for automobiles which are subject to a wide range of varying loads. More specifically, an electric generator is connected to the rotatable shaft of a gas turbine, and the electric output power generated by the generator is supplied to an electric motor mounted on the drive shaft of wheels, thus propelling the automobile.

It is not preferable for the rotational speed of the gas turbine to vary depending on changes in the load on the gas turbine. The electric generator connected to the gas turbine is therefore always supplied with the output power from the gas turbine as it rotates at high speed. Unless the size of the electric generator is large, it cannot drive the motor vehicle with good efficiency. If a smaller-size generator were used depending on the motor vehicle, it could not sufficiently absorb the output power from the turbine which rotates at high speed.

As shown in FIG. 2 of the accompanying drawings, when a turbine rotates at high speed, the effective efficiency of the output power of an electric generator which is coupled to the turbine becomes better as the load on the electric generator is higher, but lower as the electric generator is subject to a more partial load. Therefore, if a single electric generator is to cover a full range of loads, then such a system fails to increase the efficiency of the generator.

SUMMARY OF THE INVENTION

In view of the aforesaid problems, it is an object of the present invention to provide an electric generator system which can efficiently absorb the output power of a gas turbine which rotates at high speed, irrespective of whether the load connected to the generator system is large or small.

According to the present invention, there is provided an electric generator system for a gas turbine, wherein the turbine is driven by the energy of combustion gases supplied from a combustion device and the output power from an electric generator mounted on a turbine shaft is supplied to an electric motor for driving a wheel to move a motor vehicle, said electric generator system comprising a plurality of electric generators mounted on said turbine shaft, for dividing and bearing the output power of the turbine, and generating electric energy based thereon, detecting means for detecting the load of the motor vehicle as it runs, and load distributing means for imposing loads on said generators in a high efficiency range, depending on a signal from said detecting means.

In the electric generator system according to the present invention, the electric generators are mounted on the rotatable shaft of the turbine which is driven by the combustion gas energy, so that the output power of the turbine is divided and borne by the electric generators. Depending on the rotational speed of the wheel, the electric generators are selectively operated with a high efficiency at all times, and the generated electric energy is supplied to the electric motor for driving the wheel.

DESCRIPTION OF THE PREFERRED EMBODIMENT

An embodiment of the present invention will hereinafter be described with reference to the drawings.

Figure 1:
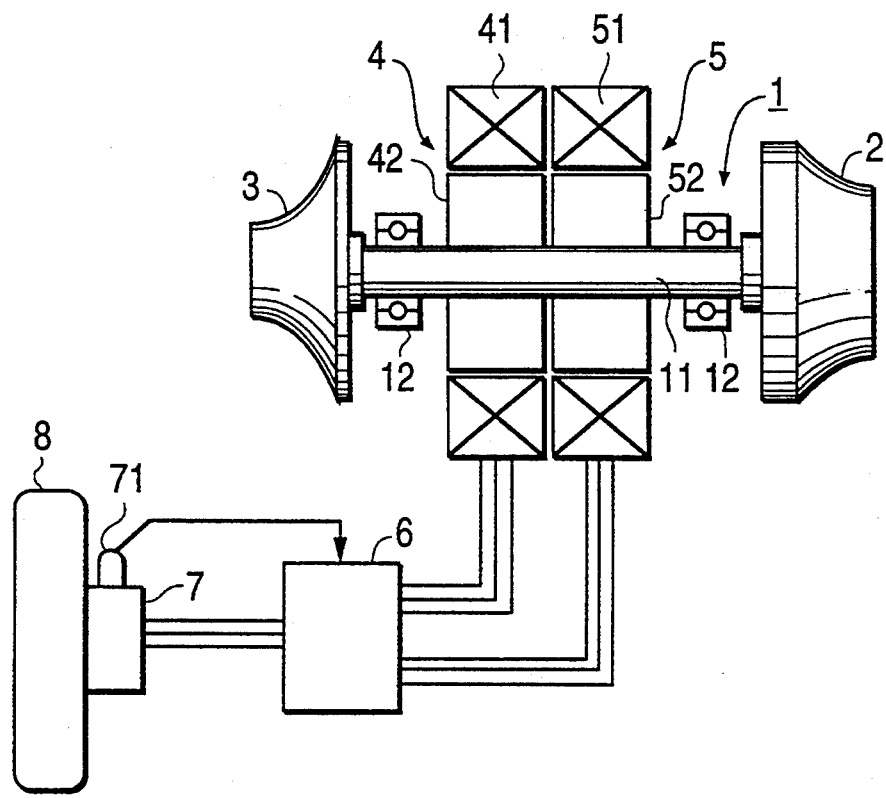
FIG. 1 is a block diagram showing an electric generator system according to an embodiment of the present invention.
Figure 2:
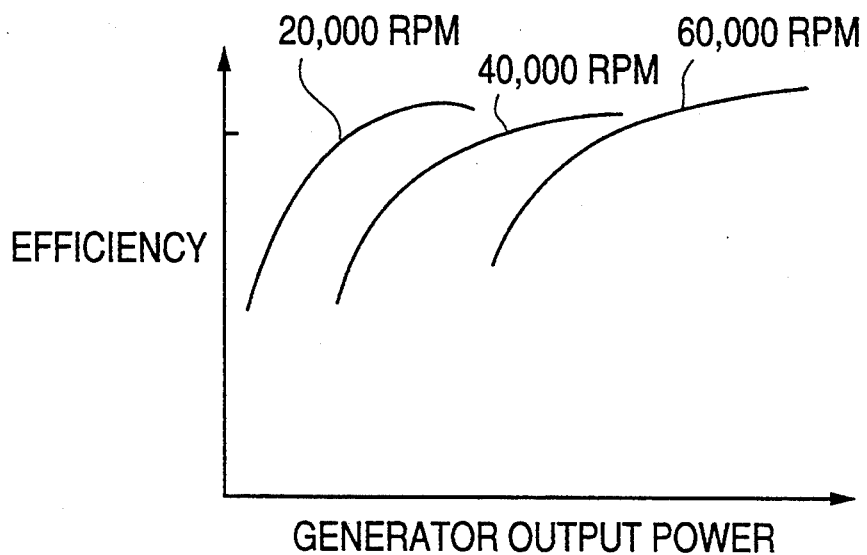
FIG. 2 is a diagram showing the output efficiency of a generator with respect to the rotational speed thereof.

FIG. 1 shows a gas turbine 1 and electric generators mounted on the shaft of the gas turbine 1. The gas turbine 1 is supplied with the energy of combustion gases from a combustion device (not shown), and is driven thereby. The turbine shaft, indicated at 11, is rotatably supported by bearings 12. On the turbine shaft 11, there are mounted a turbine impeller 2, a compressor 3, a first electric generator 4, and a second electric generator 5. The turbine impeller 2 is driven by the combustion gas energy and produces rotary mechanical output power which drives the compressor 3 to supply air to the combustion device. The first and second electric generators 4, 5 are electrically connected to an electric motor 7 coupled to a wheel 8, through a controller 6 (described later), so that generated electric power from the first and second electric generators 4, 5 is transmitted to the electric motor 7. While only one pair of the wheel 8 and the electric motor 7 is shown, there are electric motors associated respectively with the wheels of a motor vehicle for driving the motor vehicle.

The first and second electric generators 4, 5 have respective rotors 42, 52 and corresponding stators 41, 51 associated with the rotors 42, 52, respectively. The generators 4, 5 are arranged to divide and bear the turbine output power. The generators 4, 5 comprise induction-type generators, for example, rather than rotatable-magnet-type generators, so that the generators are resistant to heat. The controller 6 is connected between the generators 4, 5 and the motor 7, and comprises a control unit in the form of a microcomputer for controlling both or one of the first and second generators 4, 5 to generate AC electric energy depending on changes in the load on the motor vehicle as it runs, and a load distribution unit for converting the generated AC electric energy.

The motor 7 is directly coupled to the rotatable axle of the wheel 8. The motor 7 is supplied with the AC electric energy through the controller 6. The motor 7 is associated with a speed detector 71 which measures the rotational speed of the motor 7 to detect the speed of travel of the motor vehicle. A detected signal from the speed detector 71 is sent to the controller 6.

Operation of the electric generator system thus constructed will be described below.

The turbine impeller 2 is rotated by the energy of combustion gases from the combustion device, and the compressor 3 is rotated by the torque of the turbine impeller 2 to deliver air to the combustion device so that the combustion of fuel continues in the combustion device. Generated electric output power from the first and second generators 4, 5 is supplied through the controller 6 to the motor 7. The motor 7 directly coupled to the wheel 8 rotates the wheel 8 to move the motor vehicle.

The speed at which the motor vehicle travels is detected by the speed detector 71, and the detected signal is applied to the controller 6.

When the detected signal from the speed detector 71 is applied to the control unit of the controller 6, the control unit effects a predetermined arithmetic operation on the signal, and applies a control command to an electric power converter unit which has changeover switches and an inverter, according to a control procedure which is stored in a memory. Depending on the detected signal from the speed detector 71, the output powers from the two generators are selected and supplied to the motor 7 by the controller 6.

For example, when the vehicle speed is low or the vehicle load is small, the output power from only one of the first generator 4 and the second generator 5 is converted and supplied to the motor 7. When the vehicle speed is high or the vehicle load is large, the output powers of both the first and second generators 4, 5 are converted and supplied to the motor 7.

The controller 6 thus determines the load on the motor vehicle as it runs, depending on the detected signal applied to the controller 6 and data stored in the memory. When the vehicle load is large, the controller 6 adds the generated output powers from the first and second generators 4, 5 and supplies the sum electric output power through the power converter unit to the motor 7.

when the vehicle load as determined on the basis of the detected signal is low, the electric output power from only one of the first and second generators 4, 5 is supplied to the motor 7.

While the motor is directly connected to the wheel to move the motor vehicle in the above embodiment, the motor may be mounted on a rotatable shaft which drives a differential gear for moving the motor vehicle. In short, when the vehicle requires a large amount of torque, large output power is generated from the plural generators. When the vehicle requires a small amount of torque, small output power is generated from the first generator 5 or the second generator 7.

Although a certain preferred embodiment has been shown and described, it should be understood that many changes and modifications may be made therein without departing from the scope of the appended claims.

The electric generator system for gas turbines according to the present invention can generate electric energy highly efficiently in a full load range from a low load to a high load. Since the electric generator system can divide the mechanical output power from the turbine and generate electric energy based on the divided mechanical output power, it can cope with high-speed rotation of the gas turbine without use of a single large-size electric generator.

I claim:

1. An electric generator system for a gas turbine, the turbine is driven by the energy of combustion gases supplied from a combustion device and the output power from an electric generator mounted on a turbine shaft is supplied to a wheel-driving electric motor to move a motor vehicle, said electric generator system comprising:
   a compressor connected to the turbine shaft;
   transfer means for sending compressed air from said compressor to the gas turbine;
   a plurality of electric generators mounted on the turbine shaft, for dividing and bearing the output power of the turbine, and generating electric energy based thereon;
   detecting means for detecting the rotating speed of the wheel-driving electric motor;
   control means for determining the load of the wheel-driving electric motor from the detected rotating speed of the wheel-driving electric motor; and
   load distributing means for imposing loads on said plurality of electric generators in a high efficiency range, depending on a signal from said detecting means.

2. An electric generator system according to claim 1, wherein said control means further controls said load distributing means to add electric output powers from said plurality of electric generators for driving the motor vehicle.

3. An electric generator system according to claim 2, wherein said control means further distributes the electric output powers from said plurality of electric generators depending on drive forces of electric motors associated respectively with wheels.

* * * * *